UNITED STATES PATENT OFFICE 2,535,010

TRANSETHERIFICATION OF β-ETHER-SUBSTITUTED ESTERS

Willard J. Croxall, Bryn Athyn, and John O. Van Hook, Philadelphia, Pa., assignors to Rohm & Haas Company, Philadelphia, Pa., a corporation of Delaware No Drawing. Application October 2, 1948, Serial No. 52,602

12 Claims. (Cl. 260—484)

This invention concerns the preparation of β-ether-substituted esters. It deals with the formation of esters of the formula $$(R'O)_nCHCH_nCOOR$$

where $n$ is an integer having a value of one to two.

These β-ether-substituted esters are obtained by reacting an alcohol, R'OH, with an ester of the formula $$(RO)_2CHCH_2COOR$$

or an ester of the formula $$ROCH=CHCOOR$$

or a mixture thereof, by heating the reactants together at a temperature between 75° C. and 210° C. in the presence of a catalytic amount of an alkali metal acid sulfate, such as sodium hydrogen sulfate or potassium hydrogen sulfate. Zinc chloride acts like these acid sulfates and is equivalent thereto. The catalysts are used in an amount from 0.01% to about 1% or more of the weight of ether propionate or acrylate.

In the above formulas, R is the residue of a neutral, monohydric, non-tertiary alcohol which is free of acidic hydrogen or groups reacting with strong acids or strong alkalies and which, for purposes of the present invention, boils below about 200° C. at 10 mm. pressure. The alcohol R'OH is a non-tertiary, monohydric one which is preferably free of acyclic unsaturation in the β,γ-position and which boils higher than the alcohol ROH, which it displaces from the starting ether esters.

The above ether esters, summarized by the formula $(RO)_nCHCH_nCOOR$, where $n$ is an integer from one to two, are available through the process described in application Serial No. 52,607, filed October 2, 1948. Ether esters of the formulas $(RO)_2CHCH_2COOR$ and $$ROCH=CHCOOR$$

may both be obtained in this process. The latter are also obtainable from the former when the diether esters are heated in the presence of a dealcoholating catalyst with removal of a mole of alcohol per mole of starting ester. This procedure is described in Application Serial No. 52,608, filed October 2, 1948.

In the preparation of these ether esters, acetylene is reacted with esters of carbonic acid in the presence of strongly alkaline anhydrous catalysts. As catalysts there may be used alkali metal alcoholates, such as lithium methoxide, potassium ethoxide, sodium butoxide, and in general an alcoholate, MOR, where M is an alkali metal, or an alkali metal acetylide, such as sodium acetylide, disodium acetylide, or potassium acetylide, or a strongly basic quaternary ammonium alcoholate, particularly one which is not thermally decomposed to olefines, such as tetramethyl ammonium methoxide, benzyl trimethyl ammonium ethoxide, dibenzyl dimethyl ammonium tert.-butoxide, or an alkylated benzyl dimethyl or trimethyl ammonium alkoxide.

For the reaction with acetylene and ester of carbonic acid, $(RO)_2CO$, the ester may be formed from any non-tertiary monohydric alcohol, ROH, the residue of which is free of groups which react with alkalies, a rather evident limitation where alkaline catalysts are used. The group R may be aliphatic, cycloaliphatic, arylaliphatic, or heterocyclic. It may be straight or branched, acyclic or cyclic, and saturated or even unsaturated. When, however, the unsaturation occurs between acyclic carbon atoms in the β,γ-position relative to the position of the oxygen atom, interchange must be effected below 150° C. to avoid rearrangements which occur in the case of such unsaturated derivatives above this temperature.

The group R is preferably a hydrocarbon group and one which is free of β,γ-unsaturation, but it is not thus limited. Typical groups for R include methyl, ethyl, propyl, isopropyl, butyl, sec.-butyl, isobutyl, amyl, hexyl, octyl, decyl, dodecyl, undecenyl, benzyl, methylbenzyl, tetrahydrobenzyl, endomethylene tetrahydro- or hexahydrobenzyl, cyclohexyl, methylcyclohexyl, etc. It is most convenient to have not more than eight carbon atoms in R.

Alkyl groups are very useful as R, and it is particularly desirable that R be an alkyl group of one to two carbon atoms. The compounds methyl β,β-di(methoxy)propionate, ethyl β,β-di(ethoxy)propionate, methyl β-methoxyacrylate, and ethyl β-ethoxyacrylate are prepared in pure form in good yield from readily available materials. Since the alcohol group displaced therefrom is small, they are very economical to use.

The group R may also be an ether-containing monovalent group, examples of which are methoxyethyl, ethoxyethyl, propoxyethyl, butoxyethyl, hexoxyethyl, phenoxyethyl, ethylthioethyl, butylthioethyl, ethoxypropyl, butoxypropyl, ethoxyethoxyethyl, butoxyethoxyethyl, and ethoxybutyl. R may be, furthermore, a cyclic ether radical such as tetrahydrofurfuryl.

In the reaction between acetylene and carbonate ester, the acetylene is usually run into a mixture of ester and catalyst at 20° C. to 110° C. with or without the presence of an organic solvent. The catalyst is destroyed, as by addition of an acidic substance, or is washed away. The reaction products are isolated. There are obtained esters of the alcohols ROH and of $\beta,\beta$-diether propionic acids, of $\beta$-ether acrylic acid, and of ether succinic and maleic acids. The propionates and acrylates are readily obtained in a fraction by distillation. Usually, it is not necessary to separate these when they are to be used as starting materials in the present invention. There are some instances, however, where it is desirable to deal with the minimum amount of the alcohol ROH and, in these instances, the $\beta$-ether acrylates are desirably isolated.

The preparation of a $\beta,\beta$-diether propionate will be given to illustrate the general procedure above discussed.

There was placed in a five hundred cc. three-necked flask equipped with a gas-tight stirrer 117 grams of a 19% solution of benzyl trimethyl ammonium ethoxide in ethanol. Excess ethanol was distilled therefrom under reduced pressure, leaving the monoethylate of benzyl trimethyl ammonium ethoxide as a syrupy liquid. Thereto were added with stirring and cooling 169 grams of diethyl carbonate and twenty grams of ethyl $\beta$-ethoxyacrylate. The purpose of the latter substance was to act as an accelerator for the reaction.

The reaction flask was then equipped with a gas inlet tube and an outlet tube. After the apparatus had been flushed with nitrogen, acetylene was pressed in under ten inches of mercury pressure. The temperature of the reaction mixture rose rapidly to 45° C., and it was necessary to supply intermittent cooling to hold the temperature at about this level. In about an hour, absorption of acetylene became slow. The reactor was then cooled to room temperature. The alkaline catalyst was destroyed by careful addition of dilute acetic acid. Two layers formed. The upper, oily layer was separated and distilled.

There was first obtained a forerun of ethanol and diethyl carbonate. There was then obtained at 55°–75° C./1–4 mm. a fraction which consisted of 90% of ethyl $\beta,\beta$-diethoxypropionate and 10% of ethyl $\beta$-ethoxyacrylate. There was then taken off at 75° C./4 mm. a fraction of pure ethyl $\beta,\beta$-diethoxypropionate.

The fraction containing the mixture may be refractionated to separate the two esters. The ethyl $\beta$-ethoxyacrylate may be converted to ethyl $\beta,\beta$-diethoxypropionate by treatment with a molar proportion of ethanol and a small amount of an alkaline catalyst followed by neutralization of the catalyst.

In place of the benzyl trimethyl ammonium ethoxide used above, there may be taken other quaternary ammonium alkoxides, such as tetramethyl ammonium methoxide, trimethyl benzyl ammonium methoxide, dimethyl dibenzyl ammonium propoxide, benzyl trimethyl ammonium tert.-butoxide. Alternatively, there may be used an alkali metal alkoxide, such as sodium methoxide, sodium butoxide, or potassium hexoxide, or the like. Alkali metal acetylides are also effective catalysts.

The alcohol R'OH is, as defined broadly above, a non-tertiary, neutral, monohydric alcohol which is compatible with the acidic catalysts used and which boils higher than the alcohol ROH which is displaced. The residue R' is most commonly a hydrocarbon group but may contain such functional groups as ether, halogen, or nitro group. Typical useful groups for R' include propyl, isopropyl, butyl, sec.-butyl, isobutyl, amyl, hexyl, octyl, capryl, isooctyl, 2-ethylhexyl, nonyl, isononyl, decyl, dodecyl, cetyl, octadecyl, undecenyl, oleyl, cyclohexyl, methylcyclohexyl, butylcyclohexyl, benzyl, methylbenzyl, butylbenzyl, isooctylbenzyl, tetrahydrobenzyl, hexahydrobenzyl, endomethylene hexahydrobenzyl, methoxyethyl, butoxyethyl, octoxyethyl, phenoxyethyl, cyclohexoxyethyl, benzyloxyethyl, ethoxyethoxyethyl, butoxyethoxyethyl, phenoxyethoxyethyl, octylphenoxyethoxyethyl, butoxypropyl, octoxypropyl, ethoxypropoxyethyl, ethylthioethyl, butylthioethyl, nitroethyl, nitropropyl, nitrobutyl, bromoethyl, chloroethyl, bromopropyl, chlorobutyl, and chloroamyl. It may be noted that, when R'OH contains unsaturation in the $\beta,\gamma$-position, it is capable of causing the transetherification involved in the reaction of the present invention but that, when the resulting product is heated above 150° C., a rearrangement occurs. For many purposes, the alcohol R'OH is preferably saturated and contains four to twelve carbon atoms, particularly in a hydrocarbon group.

It is practical and effective to use the alcohol R'OH in stoichiometric excess of the diether propionate or ether acrylate. Excess alcohol serves as a useful solvent. There may be used for such purpose, however, an inert organic solvent, such as a naphtha, an aromatic hydrocarbon solvent, including benzene, toluene, and xylene, chlorinated solvent, or other inert organic solvent. Through refluxing of such solvents, the reaction temperature can be controlled and removal of alcohols expedited.

To effect the transetherification reaction, ether ester and alcohol are heated together in the presence of catalyst between about 75° C. and about 210° C., preferably 120° C. to 150° C. Heating may be done under normal, increased, or reduced pressure. Heating is continued with removal of the alcohol ROH until two moles thereof have been removed per mole of diether propionate or one mole thereof per mole of ether acrylate. If excess of the alcohol R'OH was used in the reaction mixture, it is now removed, if acrylate is to be the final product. At this stage, the catalyst is destroyed by neutralization with an alkaline reagent or by removal by washing. The products may then be obtained through distillation.

When more than one mole of the alcohol R'OH is present in the reaction mixture per mole of ether ester, and this excess is left in the reaction mixture in the presence of a catalyst while the reaction mixture is allowed to cool, there is formed diether propionate. Removal of excess R'OH in the presence of catalyst results in formation of ether acrylate. In some cases, use of excess alcohol R'OH and continuation of removal of the alcohol ROH leads to some transesterification subsequent to transetherification and also to other reactions.

Desirable methods of conducting the process of this invention are shown in the following illustrative examples.

*Example 1*

A mixture of fifty grams (0.26 mole) of ethyl $\beta,\beta$-diethoxypropionate, seventy-four grams (1.0 mole) of n-butanol, and 0.25 gram of sodium hydrogen sulfate was heated under a three-foot, glass helices packed column which was topped with a partial take-off condenser. The mixture was heated at 100°–130° C. There were obtained twenty-three grams of ethanol which distilled at 78.5°–95° C., one gram of a mixture of ethanol and n-butanol which distilled at 95°–114° C., and fifty grams of n-butanol which distilled at 114°–115° C. The theoretically expected weight of ethanol was twenty-four grams. The remaining solution was fractionally distilled in the same system under reduced pressure. The product, which distilled at 87° C./3 mm., weighed twenty-nine grams (65% yield). The material remaining in the distillation apparatus, principally "hold up" in the column, weighed 11.5 grams. The product had a refractive index, $n_D^{20}$, of 1.4489; a density, $$d_{20}^{20}$$

of 0.9715, and a molecular dispersion, $M_D$, of 46.59, and gave the following analytical values: Saponification equivalent, 171; carbon content, 63.28%; hydrogen content, 9.34%. Corresponding values for ethyl β-n-butoxyacrylate ($C_9H_{16}O_3$) are: Molecular dispersion, $M_D$, 47.55; saponification equivalent, 172; carbon content, 62.78%; hydrogen content, 9.36%. The product is thus ethyl β-n-butoxyacrylate.

Repetition of this preparation with potassium acid sulfate as catalyst likewise leads to ethyl β-butoxyacrylate in about the same yield.

*Example 2*

A mixture of ninety-five grams (0.5 mole) of ethyl β,β-diethoxypropionate, 148 grams (2.0 moles) of sec.-butanol, and 0.1 gram of sodium hydrogen sulfate was heated under a three-foot, glass helices packed column. During the reaction period, the pot temperature was 100° to 125° C. There was obtained on fractional distillation thirty-nine grams of ethanol which distilled at 78°–85° C. The mixture remaining was stripped of 101 grams of butanol under the vacuum of a water pump. The residue therefrom was then heated under a two-foot column under reduced pressure. There was obtained on fractional distillation eight grams of ethyl β-ethoxyacrylate, which distilled at 75°–100° C./10 mm., and fifty-nine grams of ethyl β-sec.-butoxyacrylate, which distilled at 96°–101° C./5–9 mm. and had a refractive index, $n_D^{20}$, of 1.4500 and a saponification equivalent of 170. Ethyl β-sec.-butoxyacrylate ($C_9H_{16}O_3$) has a theoretical saponification equivalent of 172. The fifty-nine gram fraction represents a yield of 69%.

*Example 3*

A mixture of 190 grams (one mole) of ethyl β,β-diethoxypropionate, 260 grams (two moles) of 2-ethylhexanol, and one gram of sodium hydrogen sulfate was heated in a Claisen flask. The temperature of the mixture varied from 100° to 190° C. The ethanol obtained, which was distilled off at vapor temperatures of 78°–85° C., weighed eighty-two grams. The theoretically expected weight of ethanol was ninety-two grams. The residue was poured onto ice, and the mixture was made basic by the addition of potassium carbonate. The resulting organic layer was separated, washed twice with one hundred milliliter portions of water, and dried over anhydrous calcium sulfate. The anhydrous calcium sulfate was removed by filtration. The liquid was distilled under reduced pressure through a one-foot, chain packed column. The forerun, which distilled at 35°–100° C./1 mm. and which consisted of 2-ethylhexanol, ethyl β-ethoxyacrylate, and ethyl β-(2-ethylhexoxy)acrylate, weighed 130 grams. The main fraction consisted of β-(2-ethylhexoxy)acrylate, which distilled at 100°–105° C./1 mm., weighed 120 grams, and had a refractive index, $n_D^{20}$, of 1.4500. On redistillation, this product boiled at 93° C./1 mm. and had a refractive index, $n_D^{20}$, of 1.4513; a density, $$d_{20}^{20}$$

of 0.9357; a molecular dispersion $M_D$, of 65.72, and gave upon analysis a saponification equivalent of 227, a carbon content of 68.69%, and a hydrogen content of 10.44%. For ethyl β-(2-ethylhexoxy)acrylate, theoretical values are: Molecular dispersion $M_D$, 65.06; saponification equivalent, 228; carbon content, 68.40%, and hydrogen content, 11.04%. The 120 grams of product represents a yield of 53% of ethyl β-(2-ethylhexoxy)acrylate.

When potassium acid sulfate is substituted for the sodium salt as catalyst, there is obtained in similar yield ethyl β-(2-ethylhexoxy)acrylate having the same properties as described above.

The above preparation was repeated with the variation in procedure of distilling off excess 2-ethylhexanol instead of pouring the reaction mixture onto ice. There was obtained upon distillation a main fraction of ethyl β-2-ethylhexoxyacrylate in a yield of 85%.

*Example 4*

A mixture of ninety-five grams (0.5 mole) of ethyl β,β-diethoxypropionate, 150 grams (1.5 moles) of cyclohexanol, and 0.1 gram of sodium hydrogen sulfate was heated under a two-foot, glass helices packed column. There was obtained on distillation 35.4 grams of ethanol which distilled at 77°–79° C. The pot temperature rose from 142° to 175° C. The residue was fractionally distilled through a one-foot packed column. The first fraction, which distilled at 43°–91° C./0.35 mm. and which consisted of cyclohexanol, weighed ninety-eight grams. An intermediate fraction, which distilled at 91°–96° C./0.25 mm., weighed two grams. The next fraction, which distilled at 96° C./0.25 mm. to 90° C./0.05 mm., consisted of ethyl β-cyclohexoxyacrylate. It weighed 109 grams and gave upon analysis a saponification equivalent of 186. For ethyl β-cyclohexoxyacrylate ($C_{11}H_{18}O_3$), the saponification equivalent is theoretically 198. The 109 grams of product represents a yield of 79%.

*Example 5*

A mixture of ninety-five grams (0.5 mole) of ethyl β-ethoxyacrylate, 135 grams (1.5 moles) of β-ethoxyethanol, and 0.2 gram of sodium hydrogen sulfate was heated in a reaction vessel under a two-foot column. During the reaction period, the pot temperature was 120° to 151° C. There was obtained on fractional distillation forty grams of ethanol, which distilled at 78°–81° C. The fractional distillation was continued under reduced pressure. The first fraction, which consisted of recovered β-ethoxyethanol, distilled at 51°–52° C./20–30 mm. and weighed eighty-nine grams. An intermediate fraction consisted of ethyl β-ethoxyacrylate and ethyl β-(β'-ethoxyethoxy)acrylate, which distilled at 63°–71° C./1 mm. and weighed eight grams. The next fraction consisted of ethyl β-(β'-ethoxyethoxy)acrylate and distilled at 71°–74° C./1 mm. It weighed sixty-eight grams, had a refractive index, $n_D^{20}$, of 1.4542, and gave by analysis a saponification equivalent of 186. For ethyl β-(β'-ethoxyethoxy)acrylate ($C_9H_{16}O_4$), the saponification equivalent is 188 by theory.

Example 6

A mixture of ninety-five grams (0.5 mole) of ethyl β,β-diethoxypropionate, 121 grams (1.5 moles) of ethylene chlorohydrin, and 0.1 gram of sodium hydrogen sulfate was heated under a one-foot packed column at pot temperatures of 110° to 170° C. On distillation, there were obtained thirty-two grams of ethanol, which distilled at 79°–80° C., and twenty-one grams of a 50:50 mixture (calculated from refractive index) of ethanol and ethylene chlorohydrin, which distilled at 80°–122° C. Distillation was then continued under reduced pressure. Recovered ethylene chlorohydrin, distilling at 40°–63° C./38 mm., weighed forty-three grams. An intermediate fraction, which distilled at 41°–77° C./6 mm., consisted of ethylene chlorohydrin and ethyl β-ethoxyacrylate and weighed fifteen grams. The desired ethyl β-(β'-chloroethoxy)-acrylate distilled at 81°–84° C./1 mm., weighed sixty-eight grams (76% yield), had a refractive index, $n_D^{20}$, of 1.4740, and contained by analysis 19.8% of chlorine. Ethyl β-(β'-chloroethoxy)-acrylate ($C_7H_{11}O_3Cl$) has a theoretical chlorine content of 20.0%.

Example 7

A mixture of forty-eight grams (0.25 mole) of ethyl β,β-diethoxypropionate, eighty-nine grams (0.75 mole) of 2-nitrobutanol, and 0.5 gram of sodium hydrogen sulfate was heated in a Claisen flask. The reaction pot was maintained at 140°–160° C. while 11.5 grams of ethanol, which distilled at 78° C. (vapor temperature), was collected. The reaction flask was then placed under gentle suction while an additional eight grams of ethanol was collected. The residue was distilled through a six-inch column under reduced pressure. There were obtained (a) twelve grams of a mixture of 2-nitrobutanol and ethyl β-ethoxyacrylate, which distilled at 46°–68° C./1 mm., (b) twenty-two grams of a mixture of 78% ethyl β-(2-nitrobutoxy)-acrylate and 22% 2-nitrobutyl β-(2-nitrobutoxy)acrylate (calculated from nitrogen analysis), which distilled at 68°–76° C./1 mm. and had a refractive index, $n_D^{20}$, of 1.4410, and (c) thirty-eight grams of a mixture of 51% ethyl (β-(2-nitrobutoxy)acrylate and 49% 2-nitrobutyl β-(2-nitrobutoxy)acrylate (calculated from nitrogen analysis), which distilled at 85°–87° C./1 mm. and had a refractive index, $n_D^{20}$, of 1.4414.

Example 8

A mixture of ninety-five grams (0.5 mole) of ethyl β,β-diethoxypropionate, 64.5 grams (0.5 mole) of glycerol dichlorohydrin, and 0.5 gram of sodium hydrogen sulfate was heated in a Claisen flask. The reaction mixture varied in temperature from 138° to 204° C. during the reaction. There was obtained on distillation thirty-five grams of ethanol, which distilled at 78°–84° C. and had a refractive index, $n_D^{20}$, of 1.3645, while the pot temperature rose to 204° C. The distillation was continued in vacuo. There were obtained six grams of unreacted glycerol dichlorohydrin and ethyl β-ethoxyacrylate, which distilled at 55°–61° C./6 mm., and twenty-seven grams of ethyl β-dichloropropoxyacrylate, which distilled at 61°–64° C./5 mm., had a refractive index, $n_D^{20}$, of 1.4621, and contained by analysis 30.1% of chlorine. Ethyl β-dichloropropoxyacrylate ($C_8H_{12}O_3Cl_2$) contains by theory 31.2% of chlorine. The remaining product, which consisted of a mixture of ethyl β-dichloropropoxyacrylate and dichloropropyl β-dichloropropoxyacrylate, weighed fifty-four grams and distilled at 43°–131° C./1 mm.

Example 9

A mixture of 14.4 grams (0.1 mole) of ethyl β-ethoxyacrylate, 16.2 grams (0.15 mole) of benzyl alcohol, and 0.1 gram of potassium hydrogen sulfate was heated in a Claisen flask. The temperature of the reaction mixture varied from 130° to 160° C. In two hours, there was obtained four grams of ethanol, which distilled at vapor temperatures of 78°–80° C. The distillation was continued under reduced pressure. There were obtained five grams of a mixture of unreacted ethyl β-ethoxyacrylate and benzyl alcohol, which distilled at 60°–80° C./1 mm., three grams of ethyl β-benzoxyacrylate, which distilled at 135°–145° C./1 mm. and had a refractive index, $n_D^{20}$, of 1.5280, two grams of a mixture of ethyl β-benzoxyacrylate and benzyl β-benzoxyacrylate, which distilled at 130°–170° C./1 mm., and four grams of benzyl β-benzoxyacrylate, which distilled at 170°–190° C./1 mm. and had a refractive index, $n_D^{20}$, of 1.5652.

The transetherification reactions here involved may be summarized by the following equation:

$$(RO)_nCHCH_nCOOR + nR'OH \rightarrow (R'O)_nCHCH_nCOOR + nROH$$

where $n$ is an integer from one to two, inclusive, and R and R' have the significance assigned above. It should be noted that equilibria are involved in the reactions with which this invention is concerned. There is an equilibrium between the diether propionate and the ether acrylate derived therefrom, thus:

$$(RO)_2CHCH_2COOR \stackrel{\text{(catalyst)}}{\rightleftarrows} ROCH=CHCOOR + ROH$$

At low temperatures, the reaction tends to be far to the left. Removal of ROH causes the reaction to run to the right. There is a similar situation with regard to products, thus:

$$R'CH=CHCOOR + R'OH \stackrel{\text{(catalyst)}}{\rightleftarrows} (R'O)_2CHCH_2COOR$$

With excess R'OH at low temperatures in the presence of a catalyst, the reaction tends to give the propionate at the right. Removal of the R'OH gives the β-ether acrylate at the left.

The β-ether acrylates are useful as chemical intermediates, plasticizers, and softeners. The β,β-diether propionates are also useful as plasticizers and softeners.

We claim:

1. A process which comprises reacting by heating together at 75° C. to 210° C. in the presence of an alkali metal acid sulfate as catalyst an ether ester of the formula $$(RO)_nCHCH_nCOOR$$

and an alcohol of the formula R'OH and separating from the reaction mixture an alcohol, ROH, $n$ representing an integer from one to two, inclusive, R representing the hydrocarbon residue of a neutral, non-tertiary, monohydric alcohol, ROH, having not over eight carbon atoms, R' representing a residue of a neutral, non-tertiary alcohol, R'OH, which boils higher than the alcohol ROH, the residue whereof is free of acyclic β,γ-unsaturation.

2. A process which comprises reacting by heating together at 75° C. to 210° C. in the presence of an alkali metal acid sulfate as catalyst an ether ester of the formula $$(RO)_nCHCH_nCOOR$$

and an alcohol of the formula R'OH and separating from the reaction mixture $n$ moles of the alcohol ROH per mole of said ether ester, $n$ representing an integer from one to two, inclusive, R representing the residue of a neutral, non-tertiary, monohydric alcohol, ROH, in which R is an alkyl group of not over eight carbon atoms, and R' representing a residue of a neutral, monohydric, non-tertiary alcohol, R'OH, which boils higher than the alcohol ROH, the residue whereof is free of acyclic $\beta,\gamma$-unsaturation.

3. A process which comprises reacting together at 75° C. to 210° C. in the presence of an alkali metal acid sulfate as catalyst an ether ester of the formula $$(RO)_nCHCH_nCOOR$$

and an alcohol of the formula R'OH, separating from the reaction mixture an alcohol, ROH, and destroying the catalyst, $n$ representing an integer from one to two, inclusive, R representing the hydrocarbon residue having not over eight carbon atoms of a non-tertiary, monohydric alcohol, ROH, boiling below 200° C. at 10 mm. and being free of acyclic $\beta,\gamma$-unsaturation, R' representing the hydrocarbon residue of a non-tertiary, monohydric alcohol, R'OH, which boils higher than the alcohol ROH and which is free of acyclic $\beta,\gamma$-unsaturation.

4. A process which comprises reacting together at 75° C. to 210° C. in the presence of an alkali metal acid sulfate as catalyst a compound of the formula $$(RO)_2CHCH_2COOR$$

and an alcohol of the formula R'OH, separating from the reaction mixture an alcohol, ROH, and destroying the catalyst, R representing a saturated hydrocarbon residue having not over eight carbon atoms of a non-tertiary, monohydric alcohol, ROH, boiling below 200° C. at 10 mm., R' representing the saturated hydrocarbon residue of a non-tertiary, monohydric alcohol, R'OH, which boils higher than the alcohol ROH.

5. The process of claim 4 in which both R and R' are alkyl groups.

6. The process of claim 5 in which R is an alkyl group of not over two carbon atoms and R' is an alkyl group of four to twelve carbon atoms.

7. A process which comprises reacting together at 75° C. to 210° C. in the presence of an alkali metal acid sulfate as catalyst equimolecular proportions of an ether ester of the formula $$(RO)_nCHCH_nCOOR$$

and of an alcohol of the formula R'OH, separating from the reaction mixture an alcohol, ROH, and separating an ester, $$R'OCH=CHCOOR$$

$n$ representing an integer from one to two, inclusive, R representing a saturated hydrocarbon residue having not over eight carbon atoms of a non-tertiary, monohydric alcohol, ROH, R' representing a saturated hydrocarbon residue of the non-tertiary, monohydric alcohol R'OH which boils higher than the alcohol ROH.

8. The process of claim 7 in which R is an alkyl group of not over two carbon atoms and R' is an alkyl group of four to twelve carbon atoms.

9. A process which comprises reacting together at 75° C. to 210° C. in the presence of an alkali metal acid sulfate as catalyst an ether ester of the formula $$(RO)_nCHCH_nCOOR$$

and an excess of an alcohol of the formula R'OH, separating from the reaction mixture an alcohol, ROH, destroying the catalyst, and separating an ester.

$$(R'O)_2CHCH_2COOR$$

$n$ representing an integer from one to two, inclusive, R representing a saturated hydrocarbon residue having not over eight carbon atoms of a non-tertiary, monohydric alcohol, ROH, R' representing the saturated hydrocarbon residue of a non-tertiary, monohydric alcohol, R'OH, which boils higher than the alcohol ROH.

10. The process of claim 9 in which R is an alkyl group of not over two carbon atoms and R' is an alkyl group of four to twelve carbon atoms.

11. A process which comprises reacting together at 75° C. to 210° C. in the presence of an alkali metal acid sulfate as catalyst an ether ester of the formula $$(C_2H_5O)_2CHCH_2COOC_2H_5$$

and an alcohol of the formula R'OH, separating ethyl alcohol from the reaction mixture, and destroying the catalyst, R' representing the saturated hydrocarbon residue of the non-tertiary, monohydric alcohol R'OH which boils above ethyl alcohol.

12. The process of claim 11 in which R' is an alkyl group of four to twelve carbon atoms.

WILLARD J. CROXALL.
JOHN O. VAN HOOK.

No references cited.